Figure 1:
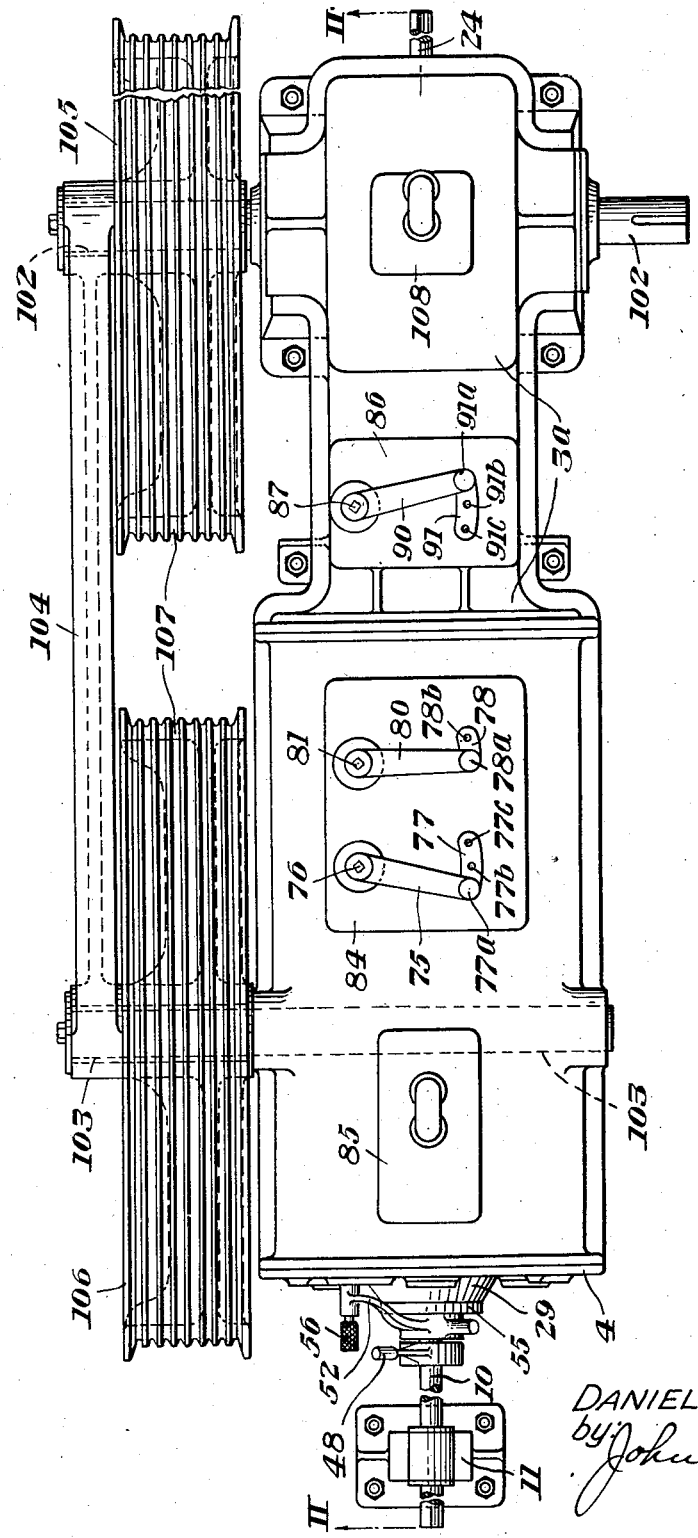

INVENTOR
DANIEL D. SYMMES
by: John E. Jackson
his Attorney.

Patented Aug. 9, 1949

2,478,674

UNITED STATES PATENT OFFICE 2,478,674

POSITIVE DRIVE VARIABLE SPEED CONTROL MECHANISM FOR REELING AND UNREELING DEVICES AND OTHER USES

Daniel D. Symmes, West Haven, Conn., assignor to The American Steel and Wire Company of New Jersey, a corporation of New Jersey Application April 1, 1944, Serial No. 529,118

3 Claims. (Cl. 74—352)

This invention relates generally to improved positive drive variable speed control mechanism, and more particularly relates to an improved positive drive variable speed gear unit particularly adapted for application to problems encountered in reeling and unreeling different kinds of materials, sometimes referred to as hauling off or on operations, such for example, as the operations and problems encountered in wire rope manufacturing where the reeling and unreeling operations are employed in connection with the rope stranding, laying machine, and other operations. It is understood, however, that the positive drive variable speed control mechanism may have various applications where positive and definite speed variation and control is desirable in relatively small increments, so that the invention may have general application to various materials and operations where reeling and unreeling operations are employed. The invention is not necessarily limited to the manufacture of wire ropes and the like, where such operations are employed.

In the various reeling and unreeling operations encountered in the manufacture of wire rope, including the rope stranding and laying machine operations, the problem of obtaining a definite and positive control of the various speeds has presented considerable difficulty. In any reeling and unreeling operation where material is wound upon, or unwound from a reel, in successive layers, or in a helical form, if the angular velocity or rate of speed of the reel is substantially constant, the lineal speed of the material being reeled upon, or unreeled from, at the point of entry or exit to and from the reel, will be continuously varying as such material passes from one layer to the next successive layer of material upon the reel. The continuously changing lineal speed of the material is due to the fact that the radial distance of the material occupying a position at the point of entry upon or exit from the reel is continuously changing as in a helice, so that the lineal peripheral speed at the circumference of the material at any particular instant will be a function of the angular velocity of the reel as expressed in revolutions per minute, and also a function of the particular radius, or distance from the axis of the reel, which position is occupied by the material at any particular instance when the material is entering or leaving the reel.

Under such conditions as those above indicated, the lineal speed or rate of speed of the material being reeled or unreeled will be continually varying, at times in intermittent or stepped periods, dependent upon the extent of the particular layer, as above indicated. For this reason the mechanism controlling the speed of the material being reeled or unreeled must be capable of variable speed control, which preferably should be positive and definite in character in order to maintain approximate or substantially constant tension in the material. In rope stranding and laying machine operations, and other operations also, the factor of maintaining a desirable substantially constant tension is one feature of importance in obtaining a rope of uniform character and quality.

An alternate or converse way of looking at the problem above presented, involving variable speed control, is to consider conditions under which, instead of having the angular velocity of the reel or unreeling device substantially constant (under which conditions the lineal speed of the material being fed to or taken from the reel would be continuously varying from time to time), the lineal speed of the material being fed to or taken from the reel is constant, and the angular velocity or rate of speed of the reel, expressed in revolutions per minute for example, is the element or factor requiring speed control, in order to synchronize the substantially constant lineal speed of the material being fed to or taken from the reel, with the lineal or peripheral speed of the reel at the point of the circumference or perimeter, and at the end of the particular radius, at which the material enters upon or leaves the reel. The latter condition, namely, a condition wherein the lineal rate of speed of the material is substantially constant, is the condition more likely to be encountered during the rope stranding and laying machine operations, wherein the particular operations performed upon the material, such for example as the rope, are performed at a substantially constant or given rate of speed. Whether the operations involve reeling or unreeling, they illustrate or represent operations requiring a definite and positive means for effecting variation of speed control; in this particular instance the element or device requiring such speed control being the particular reels employed in the reeling or unreeling operations.

In the above, the words "definite" and "positive," are not exactly used in a synonymous sense, although the concept of a definite, predictable, uniform speed or speed ratio or relation may arise or result from the fact that the variable speed control mechanism does involve the element of positiveness and directness of drive, in the sense that there is no slip factor which is introduced by the driving and driven member, which slip factor is variable, indefinite and unknown, such slip usually being variable with the character and extent of the load imposed upon the driven member. As examples of the inherent uncertainty and indefiniteness of rate of speed or speed ratio, due to the variable slip or friction factor between driving and driven members, reference might be made to the pulley and belt drive, wherein the pulley may be of varying form, as may also be the belt, which belts may also be of varying composition, such as leather, rubber and other compositions. Another illustration of a type of drive which introduces indefinite and unpredictable factors due to the uncertain slip and friction factors, is the adjustable tapered or cone-like disks or pulleys, and other devices of similar nature.

Another disadvantage and objection to the variable speed control devices which introduce an indefinite slip and friction factor is that such variable speed control units are not made in, and are not particularly adapted to transmit, relatively large horsepower sizes or units due, in part, to the excessive friction or slipping likely to be encountered under certain conditions, and to the excessive wear and replacement required, and the heat resulting therefrom. Variable speed units of the adjustable belt type are not positive, and are limited to relatively low horsepower rating, such for example as a maximum of about twenty-five horsepower. Some hydraulic types of variable speed control units are available in the larger horsepower sizes, but such hydraulic units are very costly and they also are not absolutely accurate and cannot be stated to have the desirable definite and uniform speed ratio and positive drive properties and characteristics of the positive variable speed gear unit herein referred to as constituting one of the desirable features of the present invention.

Heretofore various attempts have been made to effect a direct and positive variable speed drive by means of cumbersome open-type conventional change gears, hydraulic motors, and endless V-belts with tapered cones, but all of these have been subject to various of the objections above noted. Variable speed units of the open-type, as heretofore employed, have necessitated the replacement and interchange of gears and idler gears, in order to obtain the variable speed. While operators called upon to meet such interchange of gear relations may be said to be skilled in the art of making wire rope, such operators are not necessarily mechanics having the necessary and requisite mechanical skill to make the necessary adjustments to provide the proper degree and amount of tooth clearance and backlash which is requisite or desirable to gear operation, so that such improperly meshed gears, particularly where the open-type conventional structure and arrangement have been employed, frequently result in noisy operation, shortened gear life, broken gear teeth, accompanied by costly and expensive delays during replacement and repair.

In accordance with the present invention, the above objections and difficulties are minimized, if not eliminated, by providing positively driven variable speed gear control mechanism in which the definite speed ratio variations may be readily preset and definitely obtained by a speed selector means and a suitable securing or locking means which assures a proper meshing and gear relation for obtaining a wide variation of speed control in relatively small increments of speed variation, with a reasonable degree of assurance that over a comparatively wide range of combinations of adjustably intermeshing pairs of gears a positive and practically operable meshing of the various pairs of gears may be effected in a manner to overcome the objections and difficulties above noted, encountered in the prior art. As will hereinafter more fully appear, the employment of the cumbersome and open-type of structure is eliminated, and the various parts are so disposed and arranged with reference to each other, that a compact self-contained structure is provided, all of which parts may be readily nested and housed in a single closed casing, so that the various bearings and gears may operate in a bath of oil contained and maintained at the suitable level within the closed casing.

A further feature of importance is the employment of a plurality of means of effecting control and change in the rate of speed in relatively small increments, there being independent means of control for each of the plurality of groups or types of speed control, which might be designated for convenience of reference as a primary speed control mechanism and a supplemental speed control mechanism, connected and disposed in cascade relation. In turn, the primary speed control mechanism is capable of independent adjustments to effect a plurality of speed changes, depending upon the number of groups or banks of gears disposed on each of a plurality of speed counter-shafts, each such speed counter-shaft having its axis disposed at substantially the same radial distance from the axis of a centrally disposed driving shaft, on which an axially slidable driving gear or pinion is disposed, a suitable mounting and mechanism being provided (hereinafter to be more fully disclosed), whereby a positive driving relation may be effected, through the medium of an intermediate gear, between the single axially slidable gear on the driving shaft, and any one of the group or bank of gears on any one of the plurality of speed counter-shafts disposed about the center driving shaft at substantially equal radial distances therefrom.

The second independently actuated speed control mechanism, which might be referred to as the supplemental speed control means and which is connected in cascade or series relation with the primary speed control means, is preferably provided with means for effecting two or more speed changes together with a positive drive clutching arrangement for readily shifting from one speed to another, preferably without the necessity of requiring the disturbance of the fixed or continuous meshed relation of the pairs of gears included in the supplemental speed control mechanism.

One of the distinctive features of a plurality of independently controlled speed mechanism, arranged in cascade relation, is that a wide range of speed variation and control, in relatively small increments, may be effected by bringing the elements of the independent speed control mechanisms in various relations of combinations and permutations, with a relatively small and compact disposition and arrangement of parts. For example, as shown in the illustrative form herein, in the primary speed control mechanism, there is provided about the axis of the main driving shaft four speed counter-shafts, each having their axes at equal radial distances from the center of the driving shaft. Each speed counter-shaft in turn has a group or bank of four gears thereon, each gear being of a different size and having a different number of teeth to effect a different speed change or ratio for each one of the sixteen gears employed on the four speed counter-shafts.

As shown, in order to obtain three speed ratios, the supplemental speed control mechanism is provided with three pairs of gears in continuous meshed relation, for each one of the four speed counter-shafts of the primary speed control mechanism, and for any given speed ratio, one gear on the driven shaft serves as a single gear common to the four gears on the four respective speed counter-shafts. The specific arrangement and disposition will hereinafter be more fully disclosed. For the present purpose, it is merely desired to point out that by such a cascade arrangement and disposition of the primary speed control mechanism and the supplemental speed control mechanism, a total of forty-eight different speed ratios may be obtained, even though the sum of the speed ratios of the primary and supplemental speed control devices, as independent units, be 16 and 3 respectively, or a total sum of 19. This means that by the cascade relation of the supplemental speed control mechanism, three speeds may be obtained, for each and every one of the sixteen gears, comprising the bank of four gears on each of the four speed counter-shafts, included in the primary speed control mechanism. This wide variation in speed control is effected by having the parts so compactly and conveniently disposed that the individual elements of the primary and supplemental speed control mechanisms may be arranged in a wide variety of combinations and permutations. Of course, the particular number of speeds and speed ratios obtainable under any particular conditions will depend on the number of the gears and gear ratios selected in the various independent speed control units, and also the relative gear size or number of teeth of the elements in the particular units.

It is to be noted that the total number of different speed ratios, forty-eight in number, above designated, obtainable by virtue of the cascade relation of the independent change speed control units, is arrived at not by merely adding the number of gears, or the pair of gears, which for example as is done in ascertaining the number of possible speeds in the primary speed control mechanism wherein a bank or group of four gears is mounted on each of four speed shafts, making a total number of sixteen gears, but, such number as forty-eight is arrived at by multiplying the total number of gear speed ratios possible in the primary speed control unit, by the figure or factor 3 which represents the three speed ratios which are independently, and with greater facility, enabled to be obtained by manipulating the speed control means of the supplemental speed control mechanism. Of course, any one of these three speed ratios obtainable in the cascade connected supplementary speed control mechanism may be obtained in relation to any gear on any one of the four speed control shafts of the primary unit, so that it is by reason of this relation that the aspect of obtaining a combination and permutation of relations is made possible. As will hereinafter more fully appear, the relation of the continuously meshed three pairs of speed change gears, in the supplemental speed control unit, each of said three speeds being available for either or any one of the four speed shafts of the primary speed control unit, is such that one set of three gears mounted on the driven shaft serves as a common set of three gears, to mesh respectively with each group of three gears on each of the four speed shaft extensions of the supplemental change speed mechanism. Various portions of the perimeter of the gears constituting said common group of three gears are in continuous mesh with the various sets of three gears mounted on what in effect amounts to a continuation of each of the four speed shafts of the primary speed control unit. As above indicated, the detail construction and arrangement of the gears and associated parts of the supplemental speed control unit will hereinafter be more fully considered.

With further reference to the wide range and flexibility of speed control enabled to be obtained through the supplementary speed change control unit, arranged in cascade relation to the primary speed control unit, it might here be mentioned that this capability has peculiar and distinctive application to its functioning when employed in connection with the reeling or unreeling operations, such for example as in the manufacture of wire rope and the like. In this connection, reference has already been made to the desirability of maintaining substantially constant tension in the rope or other material being reeled or unreeled, by maintaining a sufficiently close and sensitive control of the lineal speed of the material, so as to substantially synchronize such speed with the lineal speed at the periphery of the reel, at the particular radius, at the point of entry or exit of the material at the periphery of the material being reeled on or unreeled therefrom, respectively.

As previously indicated, the speed changing or shifting means associated with the supplementary speed change control unit is of such a type that the change in speed from either one of the speeds to either of the other two speeds may be effected with greater dispatch and with greater facility than by effecting a change of speed in the primary speed control unit, wherein a change of speed necessitates the interruption of the meshing of one pair of gears, and establishing a meshing relation with another speed gear, which may or may not be upon the same speed shaft.

Of course, one of the factors contributing to the greater dispatch and facility with which the change of speeds may be effected in the supplemental speed change control unit is, as previously indicated, because of the fact that the three pairs of speed gears (speaking with reference to what amounts to an extension of only one of the speed shafts of the primary unit) are continuously in mesh, and because of the facility with which a positive driving relation may be effected with the driven shaft or member of the supplemental speed control unit, through the medium of the positive drive clutching means.

A change of speed of the driven member to either increase or decrease the speed thereof may be more readily effected through the manipulation of the positive drive clutching mechanism of the supplemental speed unit, than with the manipulation of the speed change mechanism of the primary speed control unit.

It might be desirable, in the selection of the size of the gears or pair of gears of the supplemental speed control unit, to select the same having such a relation with certain of the gears of the primary speed control unit that would enable a substantially equivalent speed ratio or relation to be had by manipulating the supplementary speed control unit, as might be obtained by manipulating the speed control means of the primary speed control unit. This might be true for either an increase or decrease in speed. The practical effect and importance of such a feature, when applied to the reeling or unreeling operations in connection with rope manufacture, is that a relatively wide range of flexibility in the adjustment and relation between the primary speed control unit and the supplementary speed control unit may be effected in which, for any given speed or gear ratio of the primary speed control unit, the initial setting of the speed control positive drive clutch of the supplemental speed control unit may be such that thereafter the supplemental speed control unit may obtain either one speed higher and one speed lower for a particular gear setting in the primary speed control unit; or two higher speeds may be effected; or two lower speeds may be effected, for any one gear on either of the speed shafts of the primary speed unit. In other words, what has been stated above is but another way of saying that a plurality of changes in speed ratio, either to increase or to decrease the speed, may be more readily effected through manipulation of the supplemental change speed control unit, to maintain the substantially constant tension of the material being reeled or unreeled. This feature is of practical importance as indicating what is thought to be a unique and outstanding advantage of the cascade relation between the two independent speed control units, because as has been previously indicated, such a speed change through the supplemental speed control unit may be effected with greater facility than as though reliance had to be placed upon manipulation of the primary speed control unit wherein gears would be required to be taken out of mesh and a new meshing relation established with another gear.

Still a further aspect and advantage in a cascade connection between the primary and the supplemental speed control units is that, if and when it does become necessary to effect a change of speed through manipulation of the primary speed control unit, it might be that the conditions are such that the next succeeding speed obtainable through the primary speed control unit is too great, or will constitute too great a change in speed, either of an increase or a decrease in speed ratios, depending upon whether the particular operation is one of reeling or unreeling, in order to maintain a synchronous relation, or substantially constant tension. Under such conditions the secondary change speed control unit may be so set as to permit the desired speed change to be made in the primary speed control unit, and either the increase or decrease in speed desired, may be obtained by proper manipulation of the secondary speed change control unit.

The conditions referred to above serve as an illustration in which the features of greater flexibility and greater facility with which a change of speed is effected in the supplemental speed control unit in its cascade connected relation with the primary speed control unit, may be employed in rope manufacturing operations, and other operations, or other applications where it is desired to maintain substantially constant tensions or synchronous speed relations, through close speed control in small increments.

One selected embodiment is shown in the accompanying drawings for purposes of illustration, but it is understood that various changes and arrangements, all within the knowledge of those familiar with the art, may be made without departing from the spirit of the invention herein disclosed.

Figure 2:
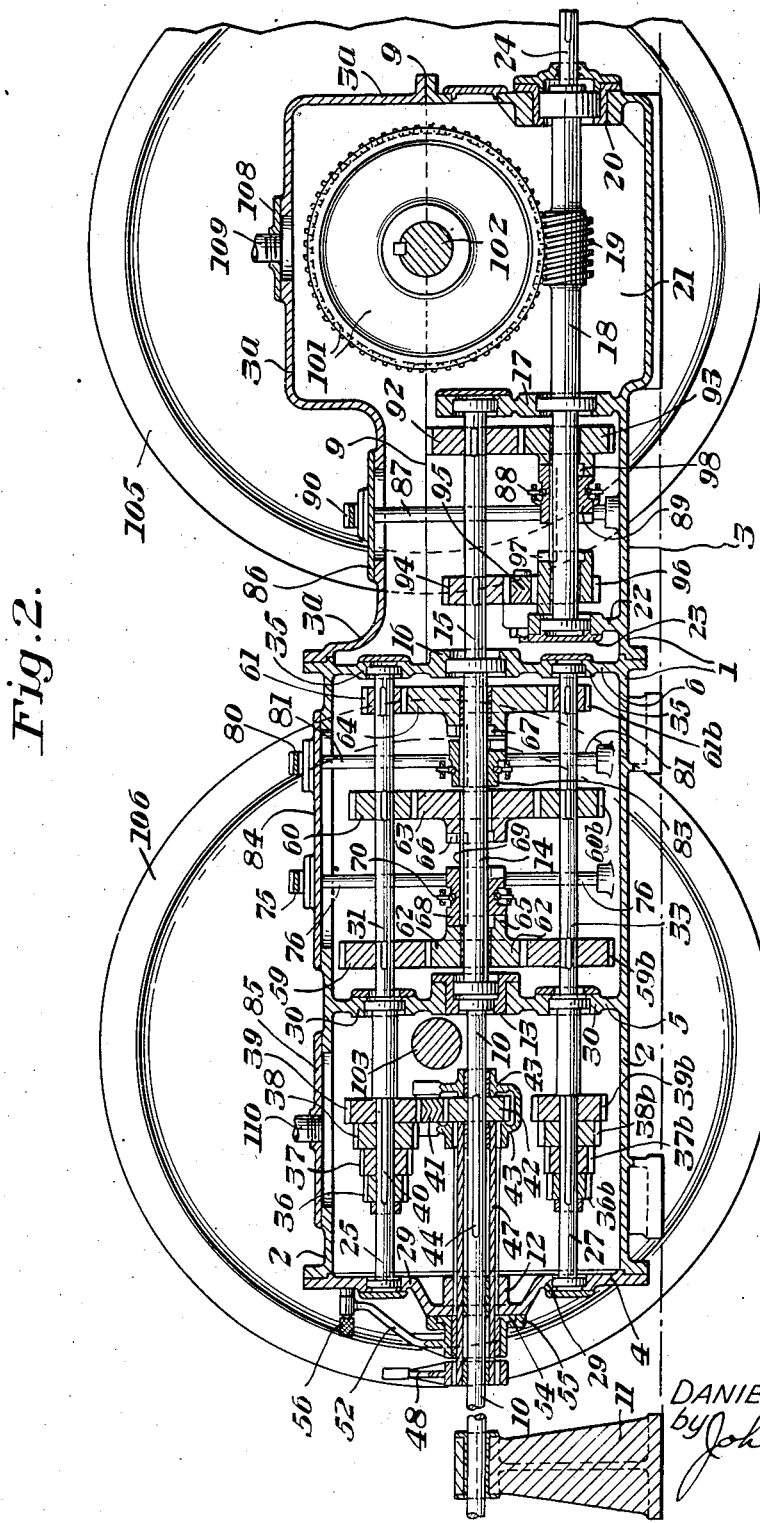
Figure 3:
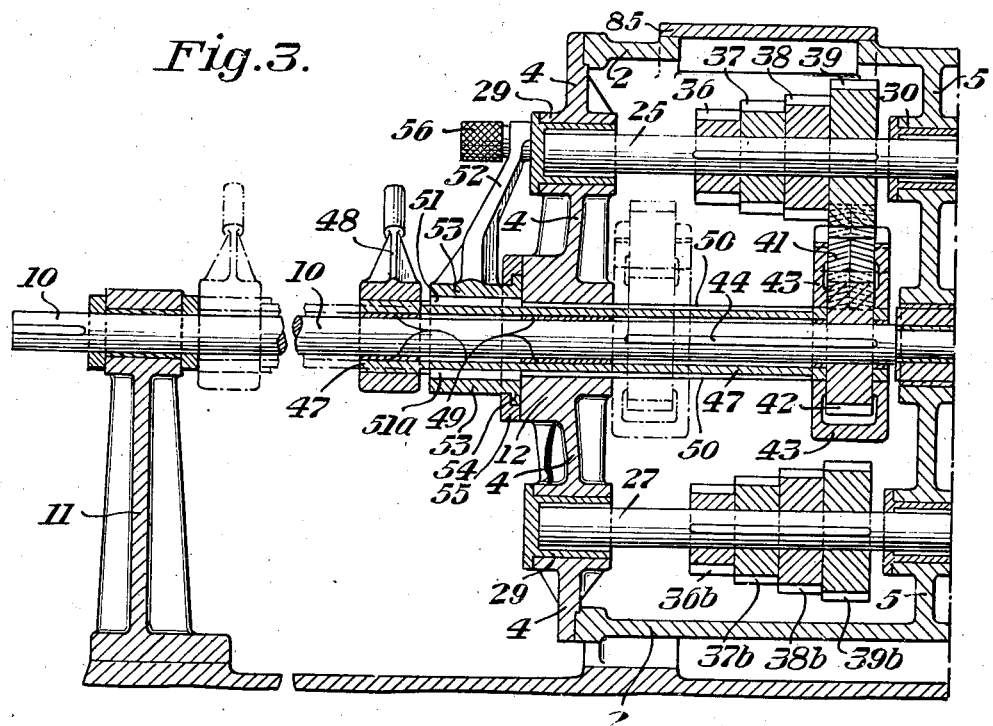
Figure 4:
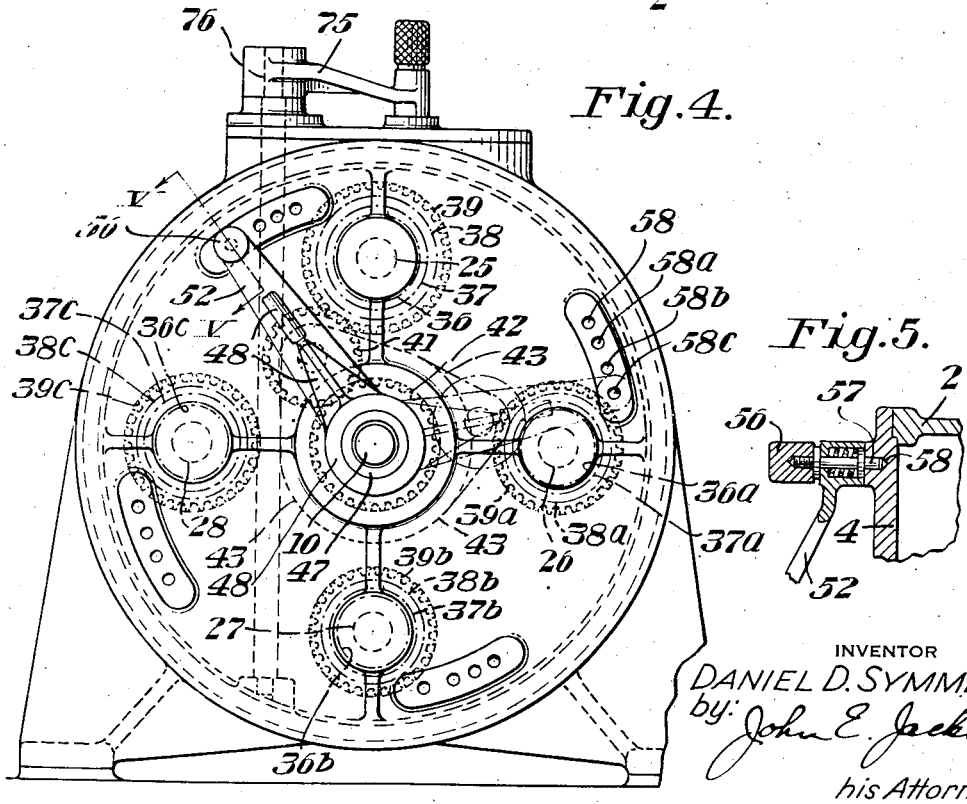
Figure 5:
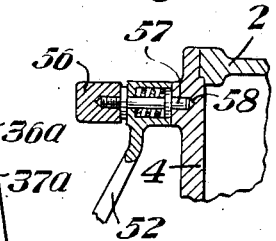

In the drawings:

Figure 1 is a top plan view of the positive drive variable speed control mechanism, looking down upon the casing housing the various speed control units and mechanism, and indicates the position and arrangement of the various speed control actuating levers for effecting the various speed relations in the primary speed control unit and the supplemental speed control unit, and also indicates a control means which serves either to disconnect the driving power means by placing in a neutral position, or to control the direction of drive, at any one of the various speeds of which the unit is capable of being operated; that is, the device is capable of being operated at a plurality of speeds in either direction. There is also shown one preferred sheave arrangement including a positively driven grooved sheave and an idler sheave, around which rope or cable may be wound in order to effect the speed control through frictional drive;

Figure 2 is a longitudinal vertical section looking in the direction of the arrows and taken on line II, II of Figure 1, showing more clearly the various arrangements of the gears in the primary speed control unit, and also in the supplemental speed control unit, and also shows the common means of control for effecting a neutral position or for effecting a reversal in the direction of the drive;

Figure 3 is an enlarged fragment in longitudinal sectional elevation, showing more clearly the primary speed control unit, indicating in phantom dot and dash line position the axial adjustment of the main drive gear, together with an intermediate gear in order to effect different speed ratios with any one speed gear of the group of gears on any one of the plurality of speed shafts, and illustrates the manner of effecting angular adjustment of the intermediate gear to effect driving relation between the respective speed shafts, and the main drive gear on the main driving shaft;

Figure 4 is an enlarged elevation looking toward the right of Figure 1, showing the casing, and the relative position and arrangement of the various speed control levers or handles of the primary speed control mechanism, which are effective for obtaining axial movement of the main drive gear and intermediate gear, and also arcuate movement of the intermediate gear in order to effect proper driving relation at the various speed ratios. The relative position and relation of the speed gears on the various speed shafts is indicated in phantom dot and dash position;

Figure 5 is an enlarged fragment in section, looking in the direction of the arrows and taken on the line V—V of Figure 4, showing more clearly an illustration of one preferred form of a readily releasable lock for positioning any one of the gears on any one of the speed driving shafts in meshed relation with the intermediate gear axially movable with the driving gear on the main drive shaft.

As shown in Figure 2 of the drawings, all of the change speed mechanism, the reversing clutching means, are enclosed within a casing which may be designated generally as 1. This is a distinct advantage and improvement over the arrangements of mechanism heretofore employed in the prior art in the manufacture of cable, because such prior art speed changing mechanism has been of the open type and has usually involved the manual changing or shifting of the gears and also has necessitated careful attention to the lubrication of the various exposed and open parts. Where the operating mechanism is conveniently and compactly arranged within a closed housing or casing, it readily adapts itself for various types or means of lubrication, one of which is that of providing oil within the casing, within which the various gears may continuously rotate, and carry the lubricant by the rotating parts to gears or bearings that may be disposed at a higher level in the casing.

As shown, the casing or housing may be said to comprise two portions, one part designated as 2, and a second part 3, 3a, split along the parting line 9. The portion designated generally as 2, is preferably formed with an open end, to the left as shown in Figure 2, for which there is provided a closure such as an end bearing cap 4 which serves as a bearing support for a main shaft 10 and various other shafts 25 to 28, each shaft having a plurality of speed gears thereon such as 36 to 39 on shaft 25, and 36b to 39b on shaft 27, said shafts 25 to 28 being radially disposed about the central shaft 10 and adapted to be driven at various speeds through an intermediate idler gear 41 (see Figures 4, 3 and 2) in a manner hereinafter to be more fully disclosed.

The portion 2 of the casing is also provided with a centrally disposed bearing wall 5 which divides the portion 2 of the casing into two sections, one of which is closed by the end bearing cap 4 as above indicated, the other end of the casing 2 being closed by the end bearing wall 6 which as shown is preferably, although necessarily, integral with the main body of the casing or housing portion 2.

The central bearing wall 5 divides the portion 2 of the housing into two parts, the part to the left serving to house what might be referred to as the various main speed change gears and the main drive pinion 42 which is mounted in a suitable manner on the drive shaft 10 so as to slide axially or longitudinally thereof so as to effect a drive relation with any one of the nests of the four gears, disposed upon any one of the four shafts 25, 26, 27 and 28, disposed, as shown, on any one of the four radii ninety degrees displaced from each other about the axis of the drive shaft 10. The particular manner, and further detail for effecting adjustment and a driving relation between the main drive pinion 42 and the nests of gears on the various shafts will hereinafter be more fully considered. It might be stated, however, that by the various driving relations between the main driving power shaft 10, and various of the other four driven shafts upon which the speed gears are mounted, sixteen different speed changes may be effected by movement or shifting of the main drive gear longitudinally or axially of the drive shaft, to not more than four different positions. This relatively short distance or movement of the main drive pinion, in relation to the disposition and arrangement of the shaft carrying the various other change speed gears for effecting such a wide range in positive drive speed change, constitutes one of the important and characterizing features of the present invention. Such an arrangement and nesting of the gears is a feature in distinguishing contrast to certain structures of the prior art, wherein as many as twelve or more different speeds may be obtained. However, one of the disadvantages and objections to prior art structures has been that as many as eight or more of the change speed gears have been mounted on a common and single shaft with bearings at the end thereof. In such a structure in driving relatively heavy loads, through the gears disposed in or adjacent to the central portion of the shaft, in order to minimize the likelihood of the strains causing bending or breakage of the shaft, the shaft and gears of relatively large size were required to be employed. This objection and difficulty is minimized, if not eliminated, by utilizing the teachings disclosed herein which enable smaller shafts and gears and gear teeth to be employed for effecting a driving of relatively heavy loads, and the bearing supports for the ends of the shafts may be spaced in a closer relation, which minimizes the strains which are likely to be placed upon the central portion of the shaft in driving relation.

The main speed change gears above referred to for effecting the sixteen different speeds are contained in the left-hand portion of the main casing or housing 2 on one side of the central bearing wall 5.

It is to be understood that while in the preferred form shown a train or nest of four gears of different size are shown on any one of the plurality of shafts such as 25 to 28, any desired number of gears may be mounted thereon, either more or less than four, as shown, to meet the particular requirements of the conditions or problems to be met, in a manner that would be well known and within the skill of the person familiar with the art.

In the portion of the main casing 1 to the right of central bearing wall 5, there is disposed an additional arrangement or nesting of gears, which by general reference and designation might be stated to be so disposed and arranged with reference to the main speed change gears in the chamber to the left of the central bearing wall 5, as to be connected in what might be termed as cascade relation with respect to any one of the sixteen gears within the chamber to the left of said central bearing wall 5.

The significance of this cascade relation in the arrangement and disposition of the trains of gears in the two chambers within the casing 2, on the right and left-hand sides respectively of the central bearing wall 5, is that the number of gear ratios and speeds obtained, may be still further increased or multiplied by a factor reported by the number of gears of different size, that are mounted on any one of the shafts designated as 31, 32, 33 and 34, as being or representing an extension of the shafts 25 to 28 inclusive within the left-hand chamber within the casing 2. For example, as shown in Figure 2, three gears 59, 60 and 61 are keyed or fixedly mounted on the shaft 31. The axis of shaft 31 within the chamber to the right of the central bearing wall 5 is in alignment with the axis of the shaft 25 disposed in the chamber to the left of said central bearing wall 5. The shaft is so arranged or disposed as to, in effect, be a continuation of the shaft 25 so the two shafts rotate in synchronism and at the same speed so that the shaft 31 is driven by or from the shaft 25. Preferably an arrangement is employed in order to facilitate the assembly of the shaft with the gears thereon, within the respective chambers of the main casing. For this purpose, preferably, the shafts 31 and 25 with the gears thereon, are separate and independently removable, a suitable connection being effected between the ends of the shafts 25 and 31 supported in the central bearing wall 5, to insure a driving connection between said shafts. For example, one means of effecting this relation would be to provide a non-circular portion of the shaft 31 at its left end, to fit within a recessed or socket of similar non-circular form, within the right-hand end of shaft 25, so as to effect a driving relation therebetween.

With respect to means for rotatingly supporting the shafts 25 to 28 inclusive and the shafts 31 to 34 inclusive which serve as continuations or extensions of the shafts 25 to 28, respectively, various means may be provided for effecting a bearing in the central bearing wall 5.

For purposes of convenience the mechanism within the chamber of the casing 2 to the left of the centrally disposed bearing wall 5, may be referred as the primary speed control unit, the various gears on the different shafts being referred to as the primary or main speed control gears; the various mechanism including the gears, shafts and clutches within the chamber to the right of the centrally disposed bearing wall 5 of the casing or housing 2, may conveniently be characterized as the secondary or supplemental speed control unit, which as above indicated, is operatively and functionally disposed in cascade relation with respect to any one of the functioning gears within the primary speed control chamber or unit.

As shown, three gears are fixed, preferably by a spline or keyway, or other suitable means, upon each of the four shafts 31 to 34 inclusive, within the secondary or supplemental speed gear unit within the secondary chamber. As shown in the longitudinal section of Figure 2, only the upper and lower shafts 31 and 33, respectively, are shown and the three gears 59, 60 and 61 of different sizes, are shown fixed on the shaft 31, and the gears 59b, 60b and 61b are shown fixed on the shaft 33. The gears 59 and 59b, on the shafts 31 and 33, respectively, are disposed in the same plane extending transversely of the axis of the respective shafts 31, 33 and such gears 59, 59b are of the same size, and are adapted to be in a continuous and constant meshing relation with a gear 62, mounted on a driven shaft 14, which is disposed within the supplemental or secondary gear chamber with its axis in alignment with the main power or driving shaft 10, disposed within the primary speed control chamber.

However, it is to be understood that while the shafts 10 and 14 may have their respective axes in alignment, there is no direct mechanical connection between such shafts 10 and 14, respectively, other than through the intermeshing gears of the primary speed control in the primary gear chamber and also through the gear connections in the secondary or supplementary gear chamber. In other words, the shafts 10 functioning as a driving shaft from the main drive pinion 42 which is axially movable thereon, rotates independently of, and at a different speed from, the shaft 14.

The shaft 14 is provided with a suitable bearing support at its opposite ends within the central bearing wall 5 and in the end bearing wall 6, which serves to close the right end of the casing or housing 2, and also the secondary or supplemental gear chamber to the right of the central bearing wall 5.

A suitable bearing support 35 for the right end of each of the shafts 31 to 34 inclusive is provided in the end bearing wall 6.

In addition to the gear 62 mounted on the shaft 14, gears 63 and 64, respectively, are mounted on the said shaft 14. The gear 63 is in the same plane transverse of the axis of the shaft 14, as are the gears 60 and 60b, respectively, so that the gear 63 is in constant and continuous mesh with the gears 60 and 60b disposed in a vertical plane on opposite sides of the axis of the shaft 14. Gears 60 and 60b are of the same size.

A similar arrangement and disposition is made of the gear 64 on the shaft 14 with respect to the gears 61 and 61b on the shafts 31 and 33, respectively. Gears 61 and 61b, in constant mesh with gear 64, are of the same size.

It is to be understood of course that while not shown in the vertical longitudinal section of Figure 2, there is provided within the secondary or supplemental speed gear chamber, two other shafts (not shown) disposed in a horizontal plane passing through and on opposite sides of the axis of the shaft 14, each of said shafts being in alignment with the shafts 28 and 27, respectively, of the primary speed control chamber, and each of said shafts have three gears of different sizes thereon, similar to and of the same size, respectively, as the three gears 59, 60 and 61, fixed upon the shaft 31; and said three gears on each of the two shafts (not shown) disposed in a horizontal plane passing through and on opposite sides of the axis of shaft 14, are disposed in continuous constant mesh relation with the three gears 62, 63 and 64, respectively, on the shaft 14.

One feature of importance contributing toward quiet and efficient gear operation is that where the various sets of gears, as in the secondary gear chamber, are in continuous meshed relation, a herringbone type of gear may be utilized instead of the spur type of gear with an involute tooth. A properly designed and chosen herringbone gear is efficient, quiet and takes up end thrust of the shaft in both directions.

It is to be noted, however, that the three gears 62, 63 and 64 are not fixedly mounted upon the shaft 14, but, on the contrary, each of said three gears are so mounted and disposed upon the shaft 14 as to be really and independently rotatable thereon. For this reason, preferably there is provided a bronze sleeve or bearing within each of the three gears 62, 63 and 64, respectively, so as to insure a long bearing life with a minimum of friction for the bearing and relative rotation, which will take place between the three gears 62, 63 and 64, and the shaft 14 upon which they are mounted and freely rotatable, except during that period during which a direct driving relation is effected between either one of said gears 62, 63, and 64, respectively, and the shaft 14 through and by means of a suitable direct drive through toothed clutch members 68, 83 which are movable axially of the shaft 14, but are so mounted and disposed as to rotate with the shaft 14, and drive the same through and from either one of the gears 62, 63 or 64, which engages the clutch members 68 or 83.

The particular clutching arrangement and relation will hereinafter be more fully disclosed. For the present, it may be sufficient to note that one of such toothed clutch members is designated by reference numeral 68 and is slidable either to the left in Figure 2 to effect a positive drive relation between the gear 62 and the shaft 14, or said toothed clutching member 68 may be moved to the right axially along shaft 14 to effect a direct toothed driving relation through the toothed side face of the gear 63, said direct driving relation being between said gear 63 and the shaft 14 through the medium of the clutch member 68. In a similar manner, a direct driving relation may be effected between the normally independently and freely rotatable gear 64 and the shaft 14, through the medium of the axially slidable toothed clutching member 83. As shown in Figure 2, the clutching member 68 is in a position to effect a direct driving relation between gear 62 and the shaft 14. The clutch member 83 is shown in neutral position and is out of driving relation relative the gear 64.

One of the distinctive and outstanding characteristics of the relative arrangement and disposition of the primary change speed gears in the primary housing, including particularly the radially disposed shafts 25 to 28 about the central drive shaft 10 and the secondary speed control unit including the plurality of trains or sets of the constantly meshing gears in the secondary gear housing, arranged in cascade relation to the gear mechanism in the primary gear housing, is that by utilizing the clutching mechanism as herein disclosed, three different speed changes may be readily and expeditiously obtained for each one of the gears (sixteen as shown) carried on the shaft extension in the primary gear housing, without requiring any interruption in the driving force or power which usually results from the interchange of gear meshing, requiring the breaking of one gear mesh and the establishing of another gear meshing to obtain the desired change of speed, which may be either higher or lower. The only interruption, which is for a very short period, is that which results from changing the clutching relation from the side face of one gear to the side face of another of the constantly meshed gears. This difference in speed in the manufacture of cable, involving a reeling or unreeling operation, where a substantially continuous and uniform tension in the cable is a very desirable if not essential characteristic, is not very great, as the conditions merely require such a change and readjustment of speed to maintain substantially uniform tension in the cable, merely involves such difference as is effected at the time of passing from one layer to another, so that the speed requirements and cable tension will remain substantially constant during the winding of any particular layer. The particular change of speed required, of course, would vary with the particular conditions and nature of the work and cable, and particularly the size or diameter of the material being either wound or unwound, or in wire or cable manufactures the size of the particular cable being handled. The particular size and relation of the three gears such for example as 59, 60 and 61, that may be mounted upon the shaft 31 (and likewise on the other three shafts radially distributed about the central shaft 14 within the secondary cascade connected speed unit) may be so disposed and of such a size as to render the transition and speed changes of the desired amount, for the particular conditions. A spring or gravity actuated idler or tension take-up sheave or pulley for the cable may be employed to compensate for any slight or immaterial disparity in speed synchronism, to maintain desired cable tension. Three of these speed changes where three of the constantly meshed gear trains are employed on one shaft in the secondary speed unit, may be employed successively to effect an increase or decrease in speed, without requiring any change in the gear meshing relation of the gears within the primary speed change gear unit.

It might be noted at this point that one of the advantages in employing a worm and gear wheel as a link in the power drive unit, particularly in the rope stranding and reeling and unreeling operations, is that the "one-way drive" and "braking" characteristic of a worm and gear drive may be effectively utilized during any interval of changing of speed either through the unmeshing and remeshing of gears, as in the primary speed unit, or merely during a change in the speed which is effected through a single clutching operation. This characteristic of the worm and drive so utilized is that any "driveback" characteristic, such as would tend to cause a slack or difference in cable tension during the period of change of speed through change of gear relations, is minimized if not fully eliminated. In this respect, the particular combination of spur and herringbone gear drive, and also the worm and gear drive, arranged in series drive relation, is by the combination and arrangement, functionally effective to produce a different and improved result as compared with the use and employment of a conventional spur gear drive throughout, even though in terms of speed adjustment only, it might be possible to effect the same or identical speeds by using spur gears throughout. The overall end results are quite different where the worm and gear wheel is introduced as a contributing element in the cable-laying operation or the reeling and unreeling operations. The particular disposition and arrangement of the worm and gear wheel will later be more fully considered.

Reference has above been made to the suitability of the constantly meshed gear trains within the supplementary cascade speed unit chamber as being well adapted and suitable for the highly efficient, quiet and end-thrust-eliminating type of gearing known as herringbone gears. On the other hand, with reference to the primary speed change gears which require a change in gear meshing relation, with a single intermediate or idler gear having a fixed diametral pitch and pitch diameter for each change of speed, involving a breaking of gear mesh and the re-establishment with the common intermediate gear of a gear meshing relation with a gear of a different size and having a different diametral pitch and pitch diameter, a spur type of gear having an involute tooth is preferably employed in the gears of the primary speed change unit in the primary chamber of the casing.

However, a herringbone type of gear may also be employed and if desired, for the gears within the primary change speed unit, if particular care be taken in the choice and design of the herringbone type gears that are there employed. One of the important factors to consider is that the character, size and number of teeth, and particularly the angle of such teeth disposed across the width of the functioning face upon the perimeter of the intermediate gear, is such as to mesh properly with the herringbone type of gear teeth on the functioning perimeter of each of the other gears of different diameter. In order that there should not be too great a difference between the common intermediate idler gear which is required to mesh with each one of the other gears (sixteen as herein shown) upon the various shafts 25 to 28 inclusive, it is preferable that the size of the common or intermediate or idler gear be substantially a mean or fair average between the size of the smallest and the largest of the gears that are employed on the shafts 25 to 28 inclusive. In herringbone gears to effect a smooth and silent and efficient operation, it is essential that the angle of the various interfitting and intermeshing teeth at the tangent point of contact, should be such as to obtain a succession of the contacting points of the various points which simultaneously establish contact, such as to obtain a substantially uniform and continuous ideal rolling effect somewhat comparable to the rolling contact force transmitted in a spur type of gear employing an involute type of tooth. Properly designed and meshing helical or herringbone gears are more efficient than spur gears. Due to the helical character of the herringbone gear, it presents problems in gear design, manufacture and meshing which are more difficult and troublesome than the spur type of tooth employing the involute type of tooth. Of course, the higher the speed of the main drive gear of the herringbone type, the less is the force required to be transmitted through the teeth so that consequently smaller teeth may be employed. The requisite size of a tooth for transmitting the required force may be obtained by having a plurality of smaller teeth angularly disposed across the width of the gear face at its perimeter. In a spur gear this width would correspond to the length of the spur gear tooth extending parallel to the axis of the gear or shaft. In a helical or herringbone gear the tooth is disposed at an angle that is different for each gear of differing pitch diameter or differing diametral pitch.

If desired, the power and speed may be transmitted directly from the driven shaft 14 to a sheave or pulley 105 having grooves 107 therein, within which grooves the cable may lie directly through a worm 19 and gear wheel 101 connection. The gear wheel 101 may be suitably fixed as by a spline or key upon a shaft 102 extending transversely of the casing 3 and having the pulley sheave 105 mounted upon one end of the shaft 102 extending outward from the casing or housing 3. Preferably, however, there is employed a reversing mechanism which is interposed between the shaft 14 and the load driven shaft 18 which carries the worm 19 thereon.

As shown in Figure 2, the reversing mechanism includes two trains of constantly meshed gears, one train including the pair of constantly and continuously meshing gears 92 and 93, and the other train of gears including the train of three gears which are constantly meshed, said train including gear 94 which is fixed or splined upon shaft 15, said gear 94 in turn meshing with an intermediate idler gear 95, which latter gear in turn meshes with the reverse gear 96 which is mounted to rotate freely and independently upon the shaft 18, a suitable bronze sleeve or bushing preferably being employed for said independently rotatable gear in a manner similar to other gears herein referred to which are independently rotatable on their respective shafts. The gear 92 on the shaft 15 is shown as being larger than the gear 94, said gear 92 being fixed or splined upon the shaft 15 so that said gear 92 is driven by the shaft 15. The gear 93 which is disposed in continuous mesh relation with gear 92 is mounted on the shaft 18 and is freely and independently rotatable thereon in a manner similar to that in which gear 96 is freely rotatable upon the shaft 18. A driving relation between the shaft 18 and the gears 93 and 96 respectively, in one direction or the other, is obtained through the clutching member 89 which is arranged to slide axially of the shaft 18 for engaging either gear 93 or 97 but said clutching member 89 is so mounted as to rotate with the shaft 18. Any suitable construction well known in the art may be employed for the clutching arrangement such as the employment of a non-circular portion on the shaft interfitting with a correspondingly shaped portion within the clutch member 89 or any equivalent or usual type of sliding key and slot relation may be employed. As shown in Figure 2, the opposite ends of the clutching member 89 is provided with a toothed portion which engages complementary interengaging toothed portions 97 and 98 upon the side face of the gears 96 and 93 respectively. Axial movement of the clutch member 89 is effected by a yoke member 88 having a portion fitting within an annular groove in the clutch member 89 intermediate its ends, in a manner well known in the art, while the yoke member 88 is actuated through a shaft 87, one end of which extends outward of the casing through a cover plate 86 disposed over an aperture extending through the upper side of the casing or housing portion 3a, said aperture facilitating the installation and positioning of the yoke member 88 and shaft 87 within the gear housing 3a. (See Figures 2 and 3.) An arm 90 is secured to and mounted upon the end of the shaft 87 which extends outwardly of the casing, said arm 90 having on its other end a suitable arrangement such as a spring pressed pin, which is adapted to fit within any one of the three recesses 91a, 91b, 91c within the positioning plate 91, for maintaining the clutch member 89 in either a neutral position corresponding to recess 91b or in a position enabling movement to be had in either one direction or the other, corresponding to the position recesses of 91a and 91c.

As shown, the shaft 15 is provided with a bearing support 16 in the end bearing wall 6 at one end of the casing; a bearing for the other end of the shaft 15 is provided in the bearing wall or support 17. The shaft 15 is in effect a continuation of shaft 14, the two being interconnected in axial alignment. The bearing wall or support also provides a bearing for the shaft 18 intermediate the ends of said shaft, the bearing at the left end of the shaft 18 being provided by the bearing post or wall 22, a suitable thrust bearing plate 23 being provided at the left end of the shaft 18, to take up or compensate for any end thrust caused by the worm 19. A bearing for the right end of the shaft 18 is provided in the bearing 20 within the end wall of the casing 3, said bearing 20 also being provided with a suitable thrust bearing to take up the end thrust caused by the worm drive 19.

In order to provide a means for maintaining tension in a cable, wire or the like during strand laying or during a reeling or unreeling operation, a second sheave or pulley 106, which might be called an idler sheave or pulley, is preferably provided and may be provided with grooves 107 corresponding to a like groove arrangement in the power driven sheave 105. (See Figure 1.)

In order to provide a compact self-contained unit having a positive drive variable speed control over a relatively wide range of speeds, particularly adapted for use in the cable manufacture, or in reeling and unreeling a wide range of materials, the two sheaves 105 and 106 are preferably mounted in operative relation with respect to the casing or housing containing the positive drive variable speed mechanism. As shown in Figure 1, the idler sheave 106 is mounted upon one end of the shaft 103 which extends outwardly of the side walls of the casing 2, said shaft preferably extending through the casing and having suitable bearing portions in opposite sides of the casing or housing 2. Preferably a link or bar 104 is provided for connecting the ends of the shafts 102 and 103 upon which the sheaves 105 and 106 respectively are mounted.

The diameter and width of the outer sheave face, and the general character of the face, whether it be grooved or plain, may be varied within a fairly wide range or selection, depending upon the particular requirements and adaptations, and the nature of the particular problem being dealt with.

In order to provide an expanded utility and adaptability of the variable speed positive drive unit, under conditions in which a relative slow speed may be desired to utilize the power driven sheave 105 and the idler sheave 106, and to also utilize a higher speed characteristic corresponding to the speed of the worm drive shaft 18, there is preferably provided a stub shaft 24 which extends outward of the case, and is in alignment with and driven by the worm gear shaft 18, a suitable bearing portion being provided for said stub shaft 24 in the end wall of the casing portion 3. Said shaft 24 may either be integral with the shaft 18, or a suitable non-circular socket arrangement may be disposed in the end of the shaft 18, so that the stub shaft 24 may be removable and detachable from its operative position when not in use, a suitable cap or cover being provided for the aperture in the bearing when the shaft 24 is detached and removed from operative position.

With reference to the general structure and arrangement of the housing or casing portion 3, containing the reverse speed mechanism and the worm and gear drive mechanism, it is noted that the housing is split along a horizontal line of parting 9, so as to form an upper housing or cap portion designated generally as 3a and the lower portion 3. Such an arrangement is desirable as facilitating assembly of the various parts of the reverse speed mechanism, and of the worm and gear wheel mechanism. As indicated in Figures 1 and 2, the shaft 102 carrying the worm gear may be firmly and accurately supported in bearing portions in opposite sides of the housing or casing 3 and 3a, the bearing portion being split along the parting line 9 so as to facilitate the positioning, removal or adjustment of the worm gear 101. A further advantage of such a construction is that shims may be either inserted or removed at the split line of the bearing portion in the casing, to enable a proper alignment and adjustment to be obtained between the worm 19 and the worm gear 101.

As more clearly shown in Figure 2, the left end of the housing or casing portion 3 and 3a is provided with a flange portion which engages a similar flange portion on the housing portion 2 and suitable well known and conventional means (not shown) such, for example, as nuts and bolts or clamps suitably disposed, may be provided for holding said housing sections in fixed tight relation. It is to be noted that the bar or link 104 connecting the ends of the projecting shafts 102 and 103 in the different sections of the housing or casing 3, 3a and 2 respectively, serves also to contribute toward holding the housing parts in a fixed, firm and rigid relation.

As more clearly indicated in Figure 4, suitable brackets may be provided to enable the housing to be secured by a suitable conventional connection, such as by bolts, to a suitable foundation or base upon which the housing may be carried.

As a means of actuating the axially slidable clutching members 68 and 83 respectively as they are mounted upon the shaft 14, there is provided for the clutch member 68, a yoke 70 (see Figure 2) which is provided with finger portions thereof which are positioned within an annular recess or groove in the clutch member 68 between the ends thereof, the yoke 70 in turn being suitably connected and disposed relative the shaft 76 extending upwardly transversely of the casing 2 so that said shaft 76 may be rotated by means of an arm 75 which is suitably secured to the end of the shaft 76 which projects outwardly through the top plate 84 of the housing 2 (see Figure 1). A suitable positioning plate 77 may be provided having three recesses 77a, 77b and 77c therein adapted to engage a suitably disposed conventional type spring-pressed positioning pin disposed in the end of the arm 75. The particular details of this construction are not shown herein as such details form no specific part of the invention, and constitute a conventional means of effecting the adjustment of an arm in any one of a plurality of positions. It is understood, of course, that various other specific means well known to the person skilled in the art may be employed for moving and maintaining the arm 75 in the different adjusted positions. The three positions of the arm 75 correspond to a neutral position such as 77b, a high speed position for the secondary speed unit, with the clutch member 68 moved to the left as shown in Figure 2 in driving relation with gear 62, corresponding to a position of the arm at position 77a as shown in Figure 1, and a medium speed position which would be assumed by the arm 75 in a position corresponding with the position recess 77c, at which time the clutch member 68 would be in operative engagement with gear 63. The third and slowest speed in the supplementary cascade connected speed unit would be obtained when the arm 75 is held in the neutral position corresponding to the recess 77b, and under conditions in which the clutch member 83 would be in driving engagement with the gear 64. To effect movement of the clutch member 83, an independent yoke member 82, shaft 81, and actuating arm 80 (see Figure 1) is shown, the arrangement and disposition of the yoke shaft and yoke 82, shaft 81 and arm 80 being generally similar to that described above in connection with the arm 75. As shown in Figure 1, a positioning plate 78 is provided having two recesses 78a and 78b, said recesses corresponding to positions in which the arm 80 would hold the clutch member 83 in a neutral or inoperative position as at 78a (as shown in Figure 2) or in a position retaining the end of the arm 80 in a position corresponding with the recess 78a when the clutch member 83 would be in driving relation with the slow speed gear 64.

If desired, a positive safety interlock may be provided to prevent movement of either arm 75 or 80 from the neutral position, while the other arm is in a position to effect operative engagement of the clutch and gears. As shown, a change in speed may be more readily effected by a single sweep or movement of the arm 75, by going directly from the second or middle speed of the secondary cascade connected gear unit to the third or high speed. In passing from the first or low speed to the second or middle speed, it necessitates two successive movements of the arms 80 and 75 respectively, one movement being one in which the arm 80 is moved from recess 78b to 78a in order to bring the clutch member 82 to a neutral position, and a second movement of arm 75 from the neutral position 77b to the position 77c, at which time the clutch member 68 would effect a driving relation with the second or middle gear 63.

As shown in Figure 2, one end of each of the shafts 76, 81 is mounted in a suitable bearing within the bottom of the housing 2, a bearing for the other end of said shafts 76 and 81 respectively being provided in a suitable cover plate 84, which covers a suitable aperture in the top of the casing 2 and also in the top of the secondary gear chamber. Any suitable conventional means may be provided for securing the cover 84 in position. Such a construction, employing the cover 84, provides an opening in the top face of the housing through which the various parts of the secondary gear unit including the various shafts and gears may be assembled and inserted in their proper relative position. Such an opening also provides a convenient means of inspection, and for the ready removal of various parts for purposes of replacement or repair.

Referring further to the speed change mechanism in the primary speed control chamber, suitable means are employed for selectively effecting a driving relation between the axially movable drive pinion 42 and any one of the sixteen gears arranged in nests of four gears disposed in stepped relation on each of the four shafts 25 to 28.

As shown in Figure 2 the movement of the main drive gear pinion 42 together with the intermediate or idler gear 41 which is in continuous or constant mesh relation with the drive pinion 42, axially along the main driving power shaft 10, may be effected in various ways and by various means, in order to effect a selected meshing or driving relation between the intermediate gear 41 and any one of the plurality of gears (four gears being herein shown) which may be in nested stepped relation upon any one of the shafts 25 to 28 inclusive. In the preferred form as shown herein (see particularly Figures 2 and 3) a housing 43 is provided for holding the intermediate gear 41 and the main drive pinion 42 in continuous meshed relation, said intermediate gear 41 being mounted on a relatively short stub shaft having ends of said shaft extending from the gear 41 on opposite sides thereof and being provided with suitable bearings within the housing 43. The housing, of course, is so disposed and arranged as to leave a sufficient portion of the perimeter of the intermediate gear 41 exposed and unobstructed, so that said intermediate gear may be moved, together with the main driving gear pinion 42, or shifted axially of the shaft 10 to effect a driving relation, through meshing of said intermediate gear 41 with any one of the four gears 36, 37, 38 and 39 (as shown in Figure 2) mounted upon the shaft 25.

In order to effect an axial shifting or sliding movement of the main drive gear 42 upon the main power driving shaft 10, various means may be provided, but as shown in the preferred form in Figures 2 and 3, a suitable slot or spline and keyway connection 44 may be provided to effect such positive drive relation between the shaft 10 and gear 42 but yet to permit free shifting or sliding of the gear axially along said shaft 10. Other arrangements may be employed such, for example, as a non-circular form or shape of the shaft, and correspondingly shaped recess within the annular bore or bearing portion of the gear 42.

The axial movement of the housing 43 is effected by operative means outside of the main housing, by providing a sleeve-like quill 47, surrounding the shaft 10 and having one end secured to the housing 43, and the other end extending along the shaft 10 to a point outside of the end cap 4 of the casing 2. A suitable arm 48 is provided thereon which may be used to facilitate the axial shifting and movement of the quill or sleeve 47, which carries the housing 43 together with the main drive pinion 42 and intermediate gear 41 contained therein with such axial movement.

Referring to Figure 4, it is to be noted that the various shafts 25, 26, 27 and 28, each of which have a nest or series of four gears in stepped relation mounted thereon, are disposed preferably, although not necessarily, upon radial lines displaced about the axis of the main driving shaft 10, ninety degrees from each other. It is desirable therefore, to provide an arrangement and disposition of the parts such that the axially movable housing 43 containing the main drive pinion 42 and the intermediate gear 41 continuously meshed therewith, may be moved to any one of the four positions between the four shafts 25 to 28 inclusive, in order that the intermediate gear 41 may mesh with any one of the four gears, on any one of the shafts 25 to 28 inclusive. That is, means are provided whereby the common intermediate or idler gear 41 may mesh with any one of the sixteen change speed gears.

Reference to Figures 3 and 4 will show the manner in which the common intermediate gear 41 may be moved from one position in which the said intermediate gear 41 may mesh with any one of the four gears such, for example, as gears 36, 37, 38 and 39 upon shaft 25, to a different ninety degree angularly displaced position such as the dot and dash line position indicated in Figure 4, in which latter position the intermediate gear 41 may mesh with any one of the four gears 36a, 37a, 38a, 39a, fixed on the shaft 26.

Reference to Figure 3 will make it clear that the housing 43 containing the main driving pinion 42 and providing a bearing for the intermediate gear 41, may be moved axially to an extreme left position indicated by the dot and dash line position, after which the sleeve-like quill 47 may be rotated and moved by the rotation of the arm 52 through an arc of about ninety degrees, after which the housing 43 and the gears 42 and 41 associated therewith may be pulled axially to the right (looking at Figure 3) so that the intermediate gear 41 may be brought to the proper position so as to mesh with either one of the four gears 36a to 39a inclusive, mounted upon the shaft 26.

It is to be noted, by reference to Figure 3, that a sufficient space is provided between the end gears 36, 36a, 36b and 36c mounted upon the shafts 25 to 28 respectively, in order to permit the housing 43 with the associated gears therewith to be moved through the space between the end gears above noted and the inner face of the bearings 29 for the various shafts 25 to 28 inclusive.

In order to provide a firm wear-resisting bearing for the tubular sleeve-like quill 47, and to permit free rotation of the driving shaft 10 therein, and at the same time to permit the sleeve-like quill 47 and its associated parts to be moved axially of the shaft as desired, there may be provided a suitable wear-resisting bearing sleeve 49 within the tubular sleeve-like quill member 47.

In order to maintain the intermediate gear 41 in meshing driving relation with any one of the four gears upon any one of the four shafts 25 to 28 inclusive, during normal driving relation, various means may be provided. In the preferred form shown, there is employed a speed change arm 52 which is mounted upon the projecting portion of the tubular quill-like member 47 between the outer face of the main bearing 12 and the arm 48. However, the arm 52 is held in fixed position relative the bearing 12 in such a manner as to prevent axial movement of the arm 52 upon the tubular member 47. The arrangement is such, however, as to permit the arm 52 to be rotated and have arcuate or angular movement with reference to the outer bearing face 12 upon which it is mounted. It will be clear that such arcuate or angular movement of the arm 52 is necessary in the form shown, in order to maintain the intermediate gear 41 in meshed relation with any one of the four gears such, for example, as either one of the gears 36, 37, 38 and 39, in the position of the parts as shown in Figure 3, because said gear are of different sizes and will require that the teeth of the intermediate gear be moved to positions at different distances from the axis of the shaft 25. The same, of course, would also be true with reference to the other shafts 26, 27 and 28, each of said shafts in turn having a plurality of gears thereon.

In order to have the angular position and disposition of the intermediaate gear 41 and its associated parts such as the main drive pinion 42 and the sleeve-like quill member 47 maintained in a fixed and controllable relation with the arm 52 and to correspond with the angular movement of the latter in the preferred form, there is provided in the outer surface of the quill member 47 a plurality of grooved slots or keyways, preferably on opposite sides of the quill member 47 and extending axially thereof from the housing 43 to the left (Figure 3) and outwardly to the arm 48. A spline or key 51, 51a is provided for fixing the arm 52 in proper relation to the housing 43, the arrangement being such that the spline or keys 51 or 51a permit, however, free axial movement of the quill 47, said spline serving merely to prevent relative rotation between the quill and the arm 52.

A suitable means is provided for holding the speed arm in any one of four positions, so as to correspond with a meshing relation of the intermediate gear 41, with any one of the four gears on the shaft, with which the housing and its parts may be associated at any particular time and under any certain conditions as desired. Various means may be provided to serve this purpose. In the form shown, referring more particularly to Figures 3, 4 and 5, there is provided for each of the four shafts, a positioning plate, each plate having a series of positioning recesses such, for example, as 58, 58a, 58b and 58c, for receiving a positioning pin 57, which may be withdrawn from any particular positioning recess, and moved to another desired position by means of the spring-pressed handle 56 (see Figure 5) mounted at the end of the arm 52.

With regard to the various speed change gears mounted on the different shafts, and the intermediate gear and the main drive pinion, under the conditions which the intermediate gear is required to form a meshing driving relation interchangeably with any one of a plurality of gears (sixteen in the preferred form shown), it may be desirable preferably to employ a spur type of gear with an involute tooth, so as to contribute toward an efficient and silent gear operation with reference to the size of the intermediate gear which is required to mesh with any one of a plurality of the sixteen other gears. It is desirable that the size or diameter of such a master intermediate gear constitute what might be called a fair average or of a size intermediate the smaller and the largest of the gears. However, if there is a certain gear range which is to be most frequently used, it may be desirable to have the intermediate gear of a size that is an intermediate or average size between the smallest and largest of such gears that are most frequently used.

Herringbone gears might be used in order to minimize or eliminate end thrust in either direction of the shaft on which said herringbone gears of proper selection and design are mounted. If the herringbone type of gears are employed under conditions wherein a single intermediate gear is required to mesh with any one of a plurality of gears, I have discovered it is a feature of importance to choose a set of gearing so that the intermediate gear will mesh accurately and efficiently with any one of the other plurality of gears, in order to eliminate any tendency of the intermeshing herringbone type of gears to cause a binding and tendency of the angularly or helically disposed teeth across the face of the various gears of different diameters to force the gears out of driving relation and impose such excessive strains and forces upon other parts, such as the arm 52 or positioning handle 56 or pin 57 as might damage the same. In order to minimize such a tendency it may be found necessary to employ a set of gears in which particular care is taken that for a given number of herringbone teeth on the intermediate gear, and with the herringbone teeth having a given angle, extending across the face of the gear, care should be taken that the angle of the herringbone teeth on each of the other plurality of speed change gears of different diameters, are such as will accurately mesh in a manner to obtain the rolling contact effect throughout the driving and functioning operation of any one of such gears with the intermediate gear. This is a problem distinct and unique, and involves critical factors and limits due to the angular or helical-like disposition of the teeth in either the helical or herringbone type of gear that is not involved in the use of the spur gear with properly designed and size of involute tooth, in which the ideal of rolling contact between intermeshing gear tooth faces is approached. In the use of spur gears, a greater tolerance of clearance, finish and variation of distance between gear centers may be had also within satisfactory range of acceptable gear operation. Efficient, quiet and satisfactory operation of helical and herringbone type of gears require close and careful finish and tolerances.

One of the important features and advantages of a positive drive variable speed unit as herein disclosed, is that advantage resulting from the combination of primary change speed control unit, with the cascade connected secondary speed control unit having the continuously meshed gear trains, making possible the use of the highly efficient, quiet and smooth operating, end-thrust-eliminating herringbone type of gears, in this particular instance, for thirty-two of the total of forty-eight speed changes, assuming the spur type of gears are used in the primary speed control unit for the sixteen speeds requiring a change of gear meshing for each speed.

I claim:

1. Positive drive variable speed control mechanism including a driving power shaft, a driven shaft, positive drive speed change mechanism interposed between said driving and driven shafts, a main driving gear mounted on said driving shaft and movable axially thereof, a counter-shaft mounted parallel to and to one side of said drive shaft, a casing housing said speed change mechanism, a plurality of speed gears of different sizes mounted on said counter-shaft, said speed gears being normally out of direct driving relation with the driving pinion on the driving shaft, an intermediate gear mounted to provide a driving relation with said pinion on the driving shaft, said intermediate gear being in constant mesh with said main drive gear, gear shift means arranged to slide said main drive gear and said intermediate gear axially along said driving shaft as a unit, to bring said unit into the same plane as any one of the plurality of speed gears on said counter-shaft, means for moving said intermediate gear in an arc about said main driving gear to selectively establish an indirect driving connection through said intermediate gear between said main drive gear and any one of the speed gears on said counter-shaft, a second counter-shaft and a plurality of different sized speed change gears thereon, said second counter-shaft being parallel to said first counter-shaft but spaced therefrom and located at substantially the same radial distance from the axis of said main driving shaft as is said first counter-shaft, the extent of axial movement of said housing actuating member, together with said cage housing said main driving gear and said intermediate gear, being sufficient to shift said cage axially to a position clear of the gear at one end of said first counter-shaft, said cage housing being adapted to be swung on an arc and moved axially to a position to effect an indirect positive driving connection with the main drive gear on the driving shaft and any one of the speed change gears mounted on any one of the plurality of counter-shafts, through the medium of said intermediate gear which is retained in permanent meshed relation with said main drive gear.

2. Positive drive variable speed control mechanism including a driving power shaft, a driven shaft, positive drive speed change mechanism interposed between said driving and driven shafts, a casing enclosing said speed change mechanism and having said driven shaft centrally journaled therein, a main driving gear slidably mounted on said driving shaft for movement axially therealong, respective counter-shafts mounted in each quadrant of said casing radially about and parallel to said driving shaft, a plurality of speed gears of different diameters mounted on each of said counter-shafts, said speed gears being normally out of direct driving relation with the driving pinion on said driving shaft, an intermediate gear mounted to provide a driving relation with said main driving gear on the driving shaft, said intermediate gear being in a constant mesh with said main drive gear, gear shift means arranged to slide said main drive gear and said intermediate gear axially along said driving shaft as a unit to bring said unit into a plane coincident with a selected one of said speed gears on a selected one of said counter-shafts, and means for moving said intermediate gear in an arcuate path concentric to the axis of the main driving gear to selectively establish an indirect driving connection through said intermediate gear between said main gear and any one of the speed gears on any one of said counter-shafts.

3. Positive drive variable speed control mechanism including a main driving power shaft, a driven shaft, positive drive speed change mechanism interposed between said driving and driven shafts comprising a substantially cylindrical hollow casing enclosing the speed change mechanism and having said driving shaft journaled axially thereof, a main driving gear mounted on said driving shaft and movable axially thereon, a plurality of respective counter-shafts journaled in said cylindrical casing at substantially equal radial distances from the axis of said casing and parallel to said main drive shaft, a respective plurality of speed gears of different diameters mounted on each of said counter-shafts, said speed gears being out of mesh with the driving pinion on the driving shaft, an intermediate gear mounted to provide a driving connection with said main driving gear on the driving shaft and any of said speed gears, said intermediate gear being in constant mesh with said main drive gear, gear shift means supported from said casing and arranged to slide said intermediate gear axially along said driving shaft as a unit and to bring said unit including said main driving gear into the same plane as any one of the plurality of speed gears on any of said countershafts, and means for moving said intermediate gear through a complete circular path about the axis of said main driving gear in order to selectively establish an indirect driving connection through said intermediate gear between said main drive gear and any one of the speed gears on any one of said counter-shafts.

DANIEL D. SYMMES.

REFERENCES CITED

The following references are of record in the file of this patent:

UNITED STATES PATENTS

| Number | Name | Date |
|---|---|---|
| 258,292 | Glover et al. | May 23, 1882 |
| 680,482 | Gabriel | Aug. 13, 1901 |
| 823,247 | Wood | June 12, 1906 |
| 864,823 | Barnes | Sept. 3, 1907 |
| 947,410 | Kjelstad | Jan. 25, 1910 |
| 1,404,739 | Broadmeyer | Jan. 31, 1922 |
| 1,662,688 | Veber | Mar. 13, 1928 |
| 1,709,233 | Schroeder | Apr. 16, 1929 |
| 1,724,202 | Jacobs | Aug. 13, 1929 |
| 1,907,118 | Newton | May 2, 1933 |
| 1,981,428 | Schneider | Nov. 20, 1934 |
| 1,997,855 | Bush | Apr. 16, 1935 |
| 2,186,168 | Groene et al. | Jan. 9, 1940 |
| 2,255,983 | Olson | Sept. 16, 1941 |